(12) United States Patent
Chung et al.

(10) Patent No.: US 6,250,364 B1
(45) Date of Patent: Jun. 26, 2001

(54) SEMI-SOLID PROCESSING TO FORM DISK DRIVE COMPONENTS

(75) Inventors: Gwendolyn Jones Chung; Walter Lloyd Prater, both of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/222,536

(22) Filed: Dec. 29, 1998

(51) Int. Cl.⁷ .................................................. C22D 23/06
(52) U.S. Cl. ............................................ 164/97; 164/113
(58) Field of Search ................................. 164/97, 98, 113

(56) References Cited

U.S. PATENT DOCUMENTS

| | | | |
|---|---|---|---|
| 3,297,415 | 1/1967 | Allen | 29/191.6 |
| 4,906,518 | 3/1990 | Inabata | 428/218 |
| 4,941,918 | 7/1990 | Horikoshi et al. | 75/229 |
| 4,949,194 | 8/1990 | MacPherson et al. | 360/104 |
| 5,122,703 | 6/1992 | Takahashi et al. | 310/36 |
| 5,143,795 | 9/1992 | Das et al. | 428/614 |
| 5,165,090 | 11/1992 | Takahashi et al. | 369/215 |
| 5,168,184 | 12/1992 | Umehara et al. | 310/13 |
| 5,240,672 | 8/1993 | Yang | 419/47 |
| 5,260,847 | 11/1993 | Basehore et al. | 360/106 |
| 5,273,569 | 12/1993 | Gilman et al. | 75/230 |
| 5,372,777 | 12/1994 | Yang | 419/47 |
| 5,382,851 | 1/1995 | Loubier | 310/13 |
| 5,413,644 | 5/1995 | Marder et al. | 148/420 |
| 5,435,825 | 7/1995 | Kusui et al. | 75/232 |
| 5,486,223 | 1/1996 | Carden | 75/244 |
| 5,501,266 | 3/1996 | Wang et al. | 164/113 |
| 5,525,374 | 6/1996 | Ritland et al. | 427/376.1 |
| 5,549,151 | 8/1996 | Yang | 164/97 |
| 5,551,997 | 9/1996 | Marder et al. | 148/437 |
| 5,561,829 | 10/1996 | Sawtell et al. | 419/13 |
| 5,573,607 | 11/1996 | Weaver | 148/437 |
| 5,578,146 | 11/1996 | Grant et al. | 148/437 |
| 5,621,590 | 4/1997 | Pace et al. | 360/106 |
| 5,627,701 | 5/1997 | Misso et al. | 360/106 |
| 5,630,466 | 5/1997 | Garat et al. | 164/457 |
| 5,642,773 | 7/1997 | Grensing et al. | 164/516 |
| 5,650,896 | 7/1997 | Viskochil | 360/106 |
| 5,656,877 | 8/1997 | Loubier | 310/13 |
| 5,672,435 | 9/1997 | Born et al. | 428/539 |
| 5,677,815 | 10/1997 | Chan | 360/106 |
| 5,679,182 | 10/1997 | Marder et al. | 148/665 |
| 5,716,467 | 2/1998 | Marder et al. | 748/549 |
| 6,072,661 | * 6/2000 | Schirle | 360/99.08 |

* cited by examiner

Primary Examiner—Kuang Y. Lin
Assistant Examiner—Len Tran
(74) Attorney, Agent, or Firm—Robert B. Martin

(57) ABSTRACT

The present invention relates to a process for the formation of components for use in a disk drive having graded properties. Particularly, the invention provides a method for forming a metal matrix composite components having graded properties. The graded properties are achieved by, for example, locating differing amounts of reinforcement material in different portions of a component and/or locating different compositions of reinforcement material in different portions of a component. Silicon carbide particles, for example, provide a low density reinforcement to an aluminum metal matrix creating a metal matrix composite having greater strength stiffness and damping.

11 Claims, 3 Drawing Sheets

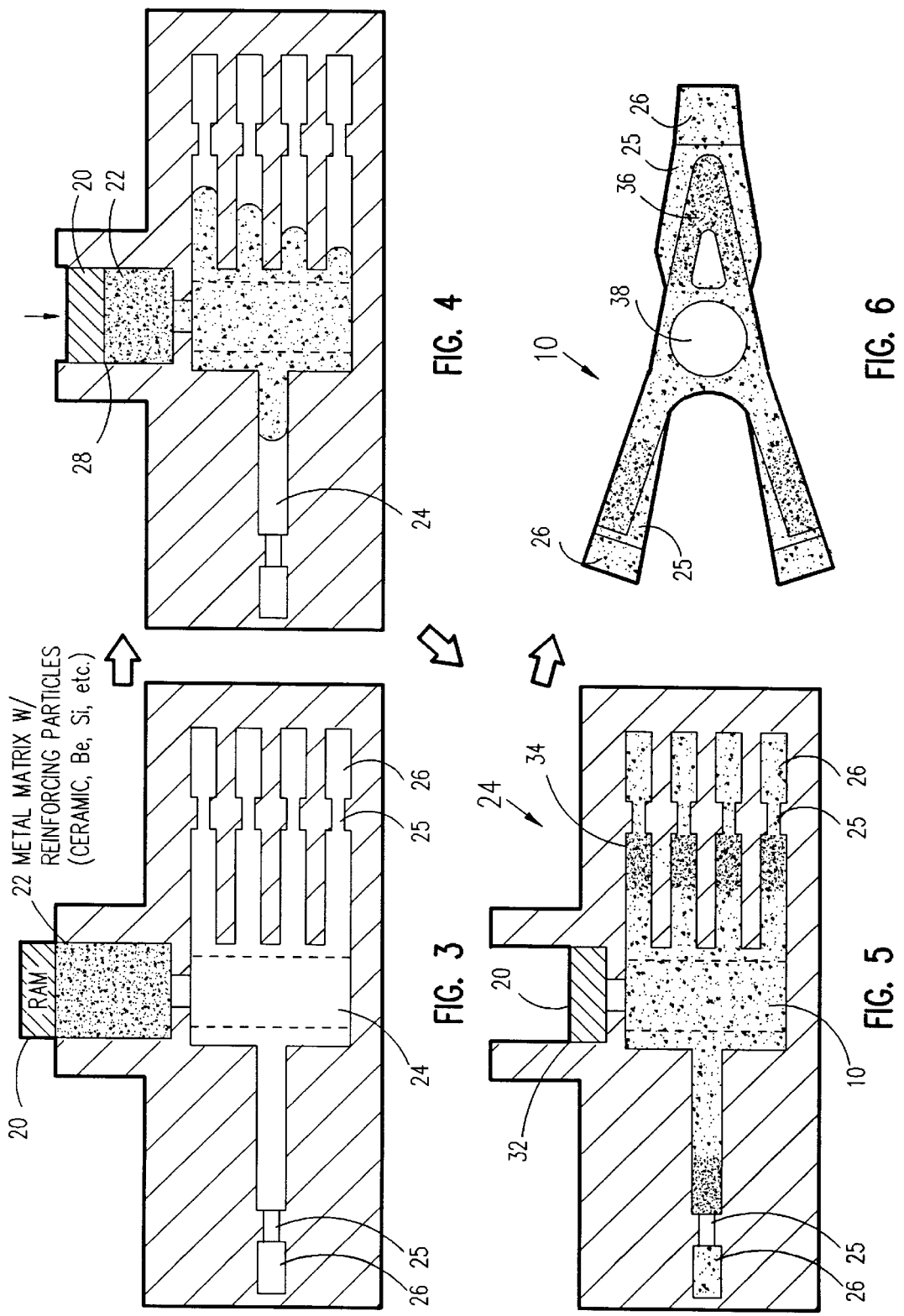

SEMI-SOLID PROCESSING TO FORM DISK DRIVE COMPONENTS

BACKGROUND OF THE INVENTION

1. Field of the Invention

The present invention relates to the formation of components for disk drives having graded properties. Particularly, the invention provides a method for forming a metal matrix composite article having graded properties. The graded properties are achieved by, for example, locating differing amounts of filler material in different portions of a formed article and/or locating different compositions of filler material in different portions of a formed article. In addition, the invention provides for the formation of macrocomposite bodies wherein, for example, an excess of matrix metal can be integrally bonded or attached to a graded metal matrix composite portion of a macrocomposite body.

2. Description of the Background Art

Current trends in the computer industry are toward lighter, smaller, more reliable computers with the capability of higher data storage and faster storage and retrieval of information. To this end, computer components, such as those for hard disk drives, are preferably lighter, stiffer, damped, smaller, more reliable, and able to perform at the faster speeds and high track densities desired. To meet these qualifications, the computer components and the conventional materials forming those components will require improvements in physical and performance properties.

Components for hard disk drives include devices such as sliders, load beams, E-blocks, actuator pivot bearings, disks, spacers, clamps, spindles, ball bearings, thrust bearings, journal bearings, base plates, housings, and covers. A slider typically carries a read/write head for reading and writing information on the disk itself. These read/write heads are transducers which read and write data onto the magnetic hard disk. Each slider in a disk drive is attached to a suspension assembly, which typically includes a flexural element attached to a load beam. Varying or uncontrolled slider/disk gap clearance can degrade the read/write signal reliability, which reduces the quality of the disk drive. Similarly, varying or uncontrolled read/write head to data track positioning can degrade the read/write signal reliability, which also reduces the quality of the disk drive. Thus, the design and materials used in these components are quite important.

The interest in composite products comprising a metal matrix and a strengthening or reinforcing phase such as ceramic particulates, whiskers, fibers or the like, has arisen because metal matrix composites combine some of the stiffness and wear resistance of the reinforcing phase with the ductility and toughness of the metal matrix. Metal matrix composites reinforced with ceramics such as silicon carbide in particulate or platelet form are of interest because of their higher stiffness, wear resistance and high temperature strength relative to metal.

Metal reinforced or ceramic reinforced metal matrix composites (MMC) are composed of a low density metal matrix surrounding reinforcing particles of low density and high specific stiffness. These can be used to manufacture actuators. Preferred low melting temperature metals to be used for the matrix are alloys of aluminum, magnesium and zinc. The reinforcing materials might be either a high melting point metal or a ceramic. The high melting point reinforcing metals of interest in MMCs are boron and beryllium. Ceramics of interest are silicon carbide (SiC) aluminum nitride (AlN), beryllia (BeO), silicon nitride ($Si_3N_4$), alumina ($Al_2O_3$), titanium carbide (TiC), magnesia ($M_3O$), titanium boride ($TiB_2$) or boron carbide $B_4C$). Other reinforcements of interest are silicon and carbon fiber. These reinforcing materials have several advantages: for example, the specific stiffness of $Si_3N_4$, $Al_2O_3$, SiC, $B_4C$ and beryllium are approximately 6 times greater than that of 6061 aluminum, the current comb extrusion alloy. The damping properties of MMC are usually better than 6061 aluminum because of the internal particle to metal interfaces which help to absorb and scatter vibrational energy.

Furthermore, alumina and silicon carbide have low electrical conductivity and may result in electrostatic charges which are not easily discharged. Therefore, data destruction due to a buildup of static electric charges can occur on pure ceramic E-blocks.

Various metallurgical processes have been described in the art for the fabrication of aluminum matrix composites, and liquid-metal infiltration techniques which make use of pressure casting, vacuum casting, stirring, and wetting agents. With powder metallurgy techniques, the metal in the form of a powder and the reinforcing material in the form of a powder, whiskers, chopped fibers, etc., are mixed and then either cold-pressed and sintered, or hot-pressed. The maximum ceramic volume fraction in silicon carbide reinforced aluminum matrix composites produced by this method has been reported to be about 25 volume percent in the case of whiskers.

The production of metal matrix composites by powder metallurgy techniques utilizing conventional processes imposes certain limitations with respect to the characteristics of the products attainable. The volume fraction of the ceramic phase in the composite is limited typically. Also, the pressing operation poses a limit on the practical size attainable. Only relatively simple product shapes are possible without subsequent processing (e.g., forming or machining) or without resorting to complex presses. Also, non-uniform shrinkage during sintering can occur, as well as non-uniformity of microstructure due to segregation in the compacts and grain growth.

Now popularly referred to as semi-solid metal processing (SSM), there are three commercial embodiments that are finding increasing use, a) semi-solid forging, b) semi-solid billet die casting and c) Thixomolding® by Thixomat, Inc. The lower temperatures and higher apparent viscosities of thixotropic SSM slurries, as compared to superheated liquid metals, provide demonstrable advantages especially upon introduction into a die cavity during injection molding. The thixotropic characteristics of metal alloys result from a fundamental alteration of the microstructure caused by mechanical shearing of the dendrites of a semi-solid slurry. This altered physical state consists of spheroidal particles that have been created by degenerating the primary dendrites and suspending them in a continuous liquid matrix. It exhibits non-Newtonian viscous behavior (1994 Ghosh, et al.). Consequently, it is possible to produce finished net shape parts with improved mechanical properties and reduced porosity when compared to die casting.

In U.S. Pat. No. 5,672,435 a multiphase ceramic-material is used to make disk drive components by using metal infiltration of a porous ceramic body. Powdered metal and ceramic precursors are reacted under heat and pressure to create ceramic composites. The brittle property of both of these materials makes their use in disk drive E-blocks problematic for arm height adjustment and swaging of suspensions onto arm tips.

Semi-solid processing of beryllium-aluminum alloys to make actuator E-blocks is disclosed in U.S. Pat. No. 5,551, 997. The processing temperature is held below the melting point of beryllium and above the melting point of aluminum so that the solid beryllium is surrounded by molten aluminum. Forming complicated geometries by semi-solid beryllium-aluminum has been found to generally be limited to 30–40% by weight of beryllium.

In U.S. Pat. No. 5,260,847 an E-block made beryllium-aluminum is made first by extruding an oversized, general outer form, and then machining all of the dimensions. This process is not economically efficient because of the large amount of expensive waste material containing a high percentage of beryllium and the additional expense of machining every dimension out of an alloy that is known to be more difficult to machine that aluminum.

Using investment casting of beryllium-aluminum alloys, disclosed in U.S. Pat. Nos. 5,642,773 and 5,578,146, has been shown to make the approximate shape of an E-block. Unfortunately this is accompanied by porosity, dendritic growth and excessive shrinkage due to the high pouring temperature required to melt both the aluminum and beryllium.

A method for producing a graded metal matrix composite, in U.S. Pat. No. 5,240,672, relies on gravity to settle the reinforcing filler particles of the molten suspension in the bottom of a mold as it slowly cools. This can require a long dwell time to produce the desired composite part.

Another method to produce a graded metal matrix composite, in U.S. Pat. No. 5,525,374, reveals infiltrating metal in a porous ceramic pre-form having varying porosity. Additional expense is incurred because it is a two step process: first the ceramic pre-form is formed, debindered and sintered followed by the second step of metal infiltration while contained in a mold.

U.S. Pat. No. 4,949,194 discloses support arms and support arm assemblies (on E-blocks) formed of ceramic materials such as alumina or silicon carbide. These ceramic materials are conventionally pre-formed into the desired shape, then densified by sintering. Although these ceramic materials offer improvements over the conventional metals, they are far from ideal. For instance, alumina and silicon carbide undergo large dimensional changes from the pre-formed state to the densified state, typically undergoing 18–20% linear shrinkage, depending upon solids volume fraction in the pre-formed state and final sintered density. The large dimensional change makes it difficult to meet component shape and dimension requirements without secondary processing. In addition, alumina, boron carbide and silicon carbide are difficult to machine to the desired dimensions and surface tolerances because of their high hardness and low fracture toughness.

To increase servo bandwidth of the disk drive, to reduce rotational moment of inertia of the actuator and to decrease the gain of comb structural resonances, alternate materials with low density, high specific stiffness and greater damping ratio are desirable.

Consequently, it is the object of this invention to put forth new component materials, and the methods of making same, in order to overcome the problems encountered in the current art while also enhancing the disk drive's performance.

SUMMARY OF THE INVENTION

The present invention relates to a method for forming a disk drive component comprising a solid metal matrix composite having a non-uniform distribution of reinforcing particles in a metal matrix. In one embodiment, a fluid (e.g., semi-solid) metal matrix composite having a uniform distribution of reinforcing particles is injected into a mold preferably having (a) the general shape of the desired disk drive component and (b) one or more flow restrictions to restrict flow of the fluid composite and thereby obtain non-uniform distribution of reinforcing particles in the matrix in the mold. The mold is then cooled and the component is removed from the mold.

In another embodiment of the present invention, a volume of fluid metal matrix composite having a non-uniform distribution of reinforcing particles in the metal matrix is forced into a mold preferably generally in the shape of the disk drive component to obtain a non-uniform distribution of reinforcing particles in the metal matrix in the mold. Graded metal reinforced or ceramic reinforced metal matrix composites (MMC) composed of a low density metal matrix surrounding reinforcing particles of low density and high specific stiffness can be used in the present invention to manufacture actuator near net shape E-blocks using the processes of semi-solid forging or thixoforging. Novel approaches to forming MMCs into a near net shape actuator comb are the processes of semi-solid metal processing (SSM) also known as semi-solid forging, semi-solid casting, thixocasting, thixomolding, rheocasting and thixoforming.

Raw materials for semi-solid forging are usually made from powders of the reinforcing metal or ceramic and powders of the metal matrix. This mixture can either be melted to make cast billets which are rolled and cut into slugs or hot isostatic pressed, extruded and cut to length. Slugs are heated to a temperature where the metal matrix starts to become liquid but still supports its own weight. The shear forces from being rammed into a die lower the viscosity by a factor of approximately 1000. This allows the molten metal to carry the solid material with it. After rapid cooling the part is ejected from the die. The key advantage to this process is closer tolerances and less porosity than die casting. The thixoforming method requires a die casting mold and equipment similar to die casting and injection molding machinery. Chopped or powdered raw material is heated and pressurized to the point that it becomes semi-solid and flows readily into the die cavity when forced by the screw mechanism.

Accordingly, it is an object of the present invention to provide an improved actuator for carrying a read/write head.

It is another object of this invention to provide an actuator with graded mechanical and thermal properties in one manufacturing step.

Another advantage of the present invention is to reduce thermally induced off-track performance of the read/write head by adjusting the composition of the MMC to produce an actuator that matches the thermal coefficient of expansion (CTE) of the spindle motor hub, spacer rings and disks.

BRIEF DESCRIPTION OF THE DRAWINGS

FIG. 3 is a side view of the mold for actuator E-block showing a ram for injecting metal matrix with reinforcing particles;

FIG. 4 is showing the injection halfway through and where the particles will be located.

FIG. 5 shows the ram for the metal matrix composite has completed its job inserting the metal matrix composite into the mold forming an E-block.

FIG. 6 is a top view of where the metal matrix composite has been cooled and the E-block has been ejected from the comb mold.

DETAILED DESCRIPTION OF THE INVENTION

One aspect of the present invention relates to hard disk drive components, such as a load beam, a support arm, an actuator, an actuator bearing, a spacer, a clamp, a spindle, a ball bearing, a thrust bearing, a journal bearing, a base plate, a housing, or a cover, formed of a metal matrix composite based material.

The method of the present invention involves forming a disk drive component, such as an E-block, from a metal matrix composite. In one embodiment, the method involves heating a die filled with MMC and continuing to apply pressure by the screw or ram for a longer duration to force the molten metal matrix through the flow restriction of the mold (referred to as dumps) and through the clogged particles, allowing more reinforcement material to be carried toward the extremities, thus increasing the concentration at the arms and coil yoke. The invention uses a minority fraction of large (2 to 25 micron), angular particles as initiators of clogging the flow-through restrictions to the dumps. Further it also uses a majority fraction of nanosize reinforcement particles to increase flow properties and it uses a trimodal or bimodal distribution of spherical particles to maximize packing.

FIGS. 1–6 are provided for a better understanding of the various hard disk drive components. Actual components in practice may vary in geometrical design from the designs. shown in the figures.

Figure 1:
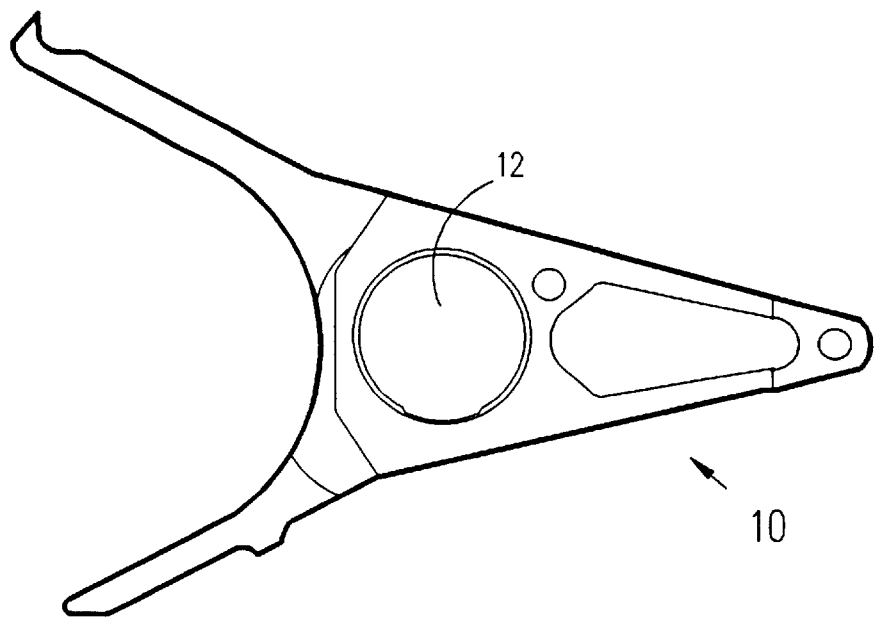
FIG. 1 is a top view of an actuator E-block for a hard disk drive.

FIG. 1 is a top view of a typical actuator E-block 10 having hole 12 for insertion of a pivot bearing, about which rotation can occur, and hole 14 for assisting in mounting a suspension assembly thereon.

Figure 2:
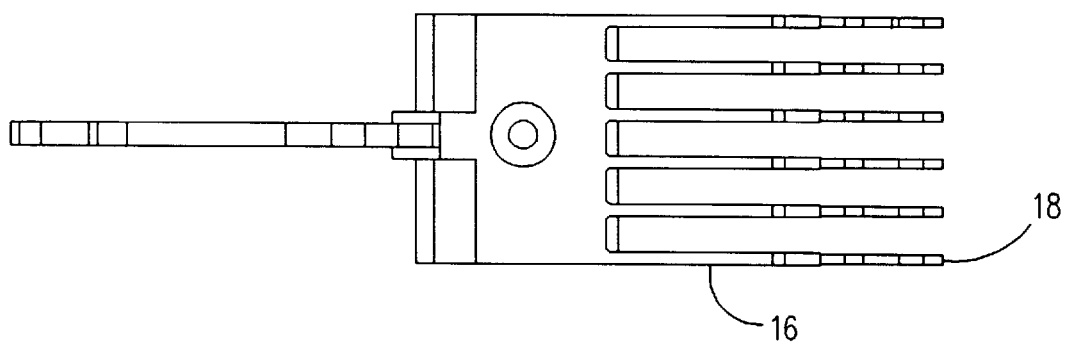
FIG. 2 is a side view of the actuator E-block assembly shown in FIG. 1.

FIG. 2 is a side view of actuator support assembly 10 which has six support arms 16 thereon, the support arms each having an arm tip 18.

FIG. 3 is a cutaway side view of the actuator E-block during forming in a mold with a ram 20 inserting the metal matrix composite billet 22 into the die cavity 24 forming the actuator E-block 10. The mold has an outlet for the actuator E-block, a flow-through restriction 25 to a dump 26 to collect excess metal matrix.

FIG. 4 is again a mold and a cutaway of that mold and showing the actuator E-block cavity 24 with the ram 20 inserting the metal matrix composite billet 22 with the insertion position shown as 28. The partial actuator E-block 10 is shown as ram 20 inserts the metal matrix composite into the desired position 30.

FIG. 5 is again a cutaway of the mold 24 and actuator E-block 10 with the metal matrix composite in place 34 and the ram 20 at a ram position 32 inserting the metal matrix composite filling the E-block mold 24. Also shown is the extra metal matrix material exiting the E-block portion of the mold 24, a narrow flow-through restrictions 25 into a dump 26.

FIG. 6 is a top view of an MMC actuator E-block 10 having the metal matrix composite in place after it has been ejected from the mold. The actuator E-block has a general opening 38. The actuator comb E-block 10 also has a tip portion 36 of reinforced metal matrix composite with concentrated reinforcement for purposes of the invention. Reinforcement phase particles are concentrated at the extremities at the arm tip and around the coil yoke. The dumps 26 and flowthrough restrictions 25 will be removed at a later machining operation.

Figure 7:
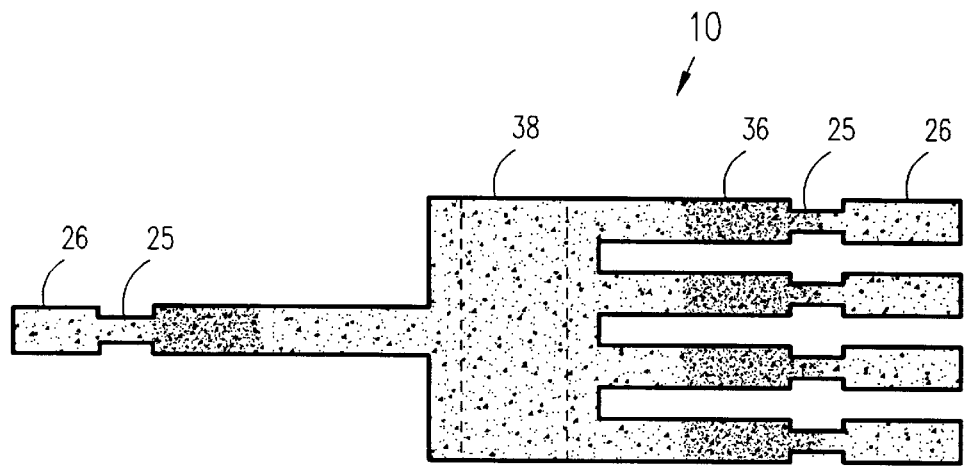
FIG. 7 is a side view of the SSM E-block removed from the mold.

FIG. 7 is a side view of an MMC actuator E-block 10 having the metal matrix composite in place after it has been ejected from the mold. The actuator E-block has a general opening 38 to receive a pivot bearing. The actuator E-block also has a tip portion 36 of a reinforced MMC with concentrated reinforcement for the purposes of the invention. Reinforcement phase particles are concentrated at the extremities at the arm tip and around the coil yoke. The dumps 26 and flow through restrictions 25 will be removed at a later machining operation.

Figure 8:
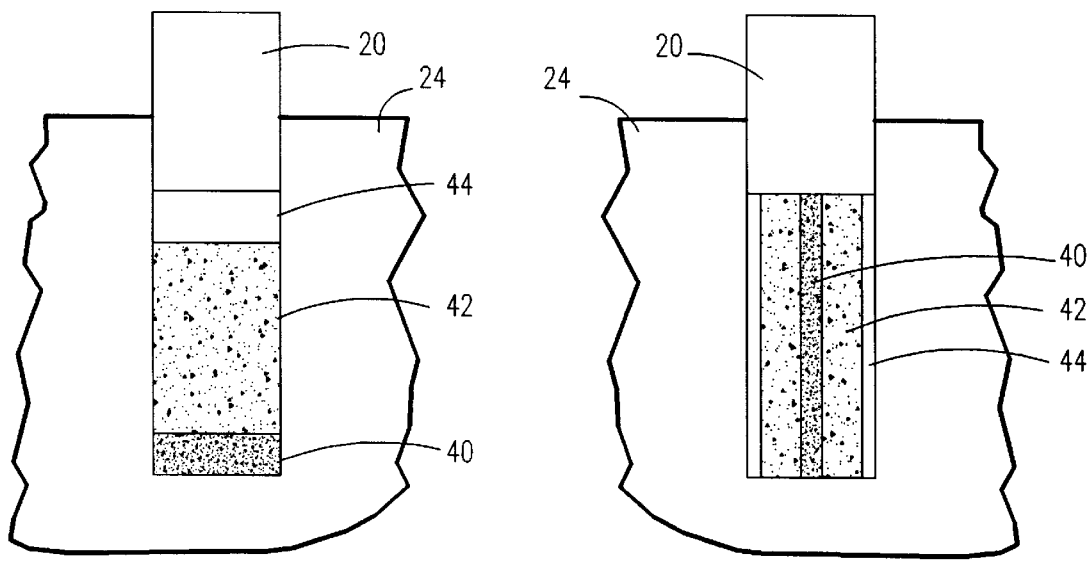
FIG. 8 is a schematic of the two graded MMC billets.

FIG. 8 shows two schematics of graded MMC billets. One billet has a reinforcement concentration gradient along its axis and the other has a radial reinforcement gradient with the larger grit reinforcement in region 40, the finer grit reinforcement MMC in region 42 and the pure metal in region 44. When the billet is forced into the mold the larger grit MMC leads and is followed by the finer grit MMC with the pure metal filling the gates. The gates act as conduits for the flowing metal not part of the E-block, because they are nonfunctional they are removed. Unreinforced gates made of pure metal are less expensive scrap reducing the manufacturing cost SSM, Thixoforming and semi-solid forming is limited to typically 30–40% solid particles when fabricating complex shapes in order to maintain the flow properties of the melt. To achieve the desired MMC properties for this E-block design, such a high percent loading is required that good material flow in the die is discouraged. Common thixoforming and semi-solid forging alloys on the market today are based on casting alloys of zinc and magnesium (aluminum and MMC SSM are active areas of research).

The extension of this concept, which we believe is possible, is to design the casting molds to selectively place the reinforcing materials in the E-block. The reinforcing particles can be concentrated by designating flow restrictions to leave a higher percentage of fill materials in areas where high stiffness and good damping is required. Less critical areas in the E-block or areas needing the properties of the matrix would have a higher concentration of the light metal. An example of this would be to design molds to maximize reinforcement rich phases in the arm section of a E-block comb with aluminum flowing by to fill the bearing bore, i.e. a gradient microstructure which is reinforcement rich at the tips of the E-block arms and aluminum rich at the bearing bore area. This type of mold design is counter-intuitive to industry practice. Turbulence in the die is encouraged to promote "clogging" by the reinforcement particles. Flow of the molten metal through and out of the die into dumps is also needed to carry and then leave behind a larger concentration of reinforcement particles. The thixo-formed part would also have a skin composed of the light metal constituent, which is desirable for contamination control because ceramic reinforcement particles are not exposed to the disk drive.

A graded billet can be used in semi-solid forging by having a high concentration of large reinforcing particle at the front, a middle section with small reinforcing particles, and a rear section of pure metal. During forging material with large particle enter the die first and clog the dumps, the second portion of MMC fills the die with some of the matrix flowing through to the dumps, the trailing metal portion fills the gate and is removed later as waste.

Method of Making Components

Variation in the mechanical and thermal properties of a multi-phase metal matrix composite material may be achieved without significant changes in density by manipulation of the level of reinforcement used and/or leaving larger amounts of reinforcement particles in metal depleted zones.

For example, bodies can be produced such that the following exemplary properties are achieved: graded thermal conductivities, graded stiffness, graded thermal expansion coefficients, graded mechanical strengths, graded ductility, graded electrical conductivities, etc. To maximize particle packing the reinforcement phase may be nearly spherical with a bimodal or trimodal diameter distribution of a ratio approximately 1 to 0.414 and 1 to 0.225. To minimize the viscosity and improve flow properties of the melt, nanosize (submicron diameter) particles are used. A minority phase of large angular particles (2–30 microns) act as an initiator of clogging of the flow-through restrictions into the dumps of the die. Accordingly, by appropriately selecting a particle size distribution, and/or an appropriate density distribution of filler, and/or different morphological properties of the filler, advantage can be taken of, for example, differences in settling times of different portions of the filler which leads to a grading of a metal matrix composite body or metal matrix composite region (i.e., a filler-rich region) of a macrocomposite body. Thus, bodies can be manufactured such that there is a primarily metal-rich region and a primarily filler- rich region, whereby the primarily filler-rich region can be graded from one side to the other.

In all instances, once a molten suspension is formed, the suspension is caused to be located by pouring, casting, injecting, etc., said suspension into a cavity of a mold of a desirable size and shape. The amount of time that the suspension is housed or dwells within the mold and the temperature which the suspension experiences during such dwell time contributes to the type and/or amount of filler settling which occurs. Accordingly, it is the synergism between all ingredients in the molten suspension, as well as the pressure under which the molten suspension is subjected, as well as temperature to which the molten suspension is subjected and the time which the molten suspension dwells within a mold (i.e., the amount of time prior to the matrix metal of the molten suspension hardening) which influence the properties of a formed graded composite body, when such a graded composite body is desired.

Many modifications and variations of the present invention are possible in light of the above teachings. Therefore, within the scope of the appended claims, the present invention may be practiced otherwise than as specifically described.

What is claimed is:

1. A process for forming an article for use in a disk drive comprising:
    a) heating a metal matrix composite comprising reinforcing particles and a metal matrix to a fluid state;
    b) injecting the heated fluid metal matrix composite into a mold having a shaped cavity of said article and a flow restriction connected to a dump cavity to hinder the flow of fluid composite to a portion of said shape cavity, such that to accumulate higher concentration of said reinforcement particles adjacent to said flow restriction; and
    c) cooling the fluid composite to form a cast product; and
    d) removing solidified metal formed in said dump cavity and said flow restriction to obtain said article.

2. The process according to claim 1 wherein the reinforcing particles are selected from the group consisting of silicon carbide, silicon nitride, alumina, boron carbide, beryllium, titanium carbide, titanium boride, magnesia, beryllia, aluminum nitride, boron and silicon.

3. The process according to claim 1 wherein the metal matrix is selected from the group consisting of aluminum, magnesium, or zinc.

4. The process according to claim 1 wherein the reinforcing particles are generally spherical.

5. The process according to claim 1 wherein the composite is made from powders of the reinforcing metal or ceramic and powders of the metal matrix.

6. The process according to claim 1 wherein article is an actuator.

7. The process of claim 1 wherein the matrix is comprised of at least 30 weight percent of the reinforcing particles.

8. A process for forming an article for use in a disk drive comprising:
    a) heating to a fluid state a metal matrix composite comprising reinforcing particles distributed in a metal matrix;
    b) injecting the heated fluid metal matrix composite into a mold having a shaped cavity of said article and a flow restriction connected to a dump cavity to hinder the flow of fluid composite to a portion of said shape cavity, such that the reinforcing particles non-uniformly distributed in a metal matrix and having higher concentration adjacent to said flow restriction,
    c) cooling the fluid composite to form a cast product,
    d) removing solidified metal formed in said dump cavity and said flow restriction to obtain said article.

9. The process according to claim 8 wherein the reinforcing material group selected from the group consist of silicon carbide, silicon nitride, titanium carbide, titanium boride, magnesia, beryllia, aluminum nitride, alumina, boron carbide, beryllium, boron and silicon.

10. The process according to claim 8 wherein the metal matrix is selected from the group consisting of aluminum, magnesium, or zinc.

11. The process according to claim 8 wherein the reinforcing particles are generally spherical.

* * * * *